United States Patent
Piazzalunga et al.

[11] Patent Number: 6,150,790
[45] Date of Patent: Nov. 21, 2000

[54] METHOD FOR THE STARTING AND STEADY-STATE SUPPLY OF A PERMANENT-MAGNET SYNCHRONOUS MOTOR PARTICULARLY FOR DRIVING A HYDRAULIC PUMP

[75] Inventors: Giovanni Piazzalunga, Petosino; Roberto Faccin, Sarcedo, both of Italy

[73] Assignees: Sicce S.p.A., San Pietro in Gù; Tait S.r.l., Almè, both of Italy

[21] Appl. No.: 09/541,074

[22] Filed: Mar. 31, 2000

Related U.S. Application Data

[63] Continuation of application No. PCT/EP99/05554, Aug. 2, 1999.

[30] Foreign Application Priority Data

Aug. 7, 1998 [IT] Italy ................................ MI98A1876

[51] Int. Cl.[7] .............................. H02P 1/46; H02P 3/18; H02P 5/28; H02P 7/36
[52] U.S. Cl. ......................... 318/700; 318/706; 318/707; 318/714; 318/254; 318/430
[58] Field of Search .................................. 318/700, 706, 318/707, 714, 430, 254

[56] References Cited

U.S. PATENT DOCUMENTS

| | | |
|---|---|---|
| 5,315,225 | 5/1994 | Heinrich et al. ................. 318/712 |
| 5,323,094 | 6/1994 | Kaneda et al. . |
| 5,327,052 | 7/1994 | Sakurai et al. . |
| 5,434,491 | 7/1995 | Marioni ................................ 318/700 |
| 5,475,292 | 12/1995 | Nakanishi et al. .................. 318/705 |
| 5,801,509 | 9/1998 | Sawa et al. ......................... 318/705 |
| 5,963,005 | 10/1999 | Yamaji ............................... 318/685 |
| 5,969,496 | 10/1999 | Yamada et al. ..................... 318/715 |

FOREIGN PATENT DOCUMENTS 98 06167   2/1998   WIPO .

*Primary Examiner*—Robert E. Nappi
*Assistant Examiner*—Edgardo San Martin
*Attorney, Agent, or Firm*—Guido Modiano; Albert Josif; Daniel O'Byrne

[57] ABSTRACT

A method for the starting and steady-state supply of a permanent-magnet synchronous motor, particularly for driving a centrifugal hydraulic pump. The method comprises three successive steps: a first learning step, a second starting step, and a third steady-state step. During the first step, the rotor is turned through two angles of 180 mechanical degrees in the same direction, storing the parameters of the rotor and particularly determining the initial current and the mechanical zero point of the rotor. During the second step, by generating with a power supply (inverter) a practically sinusoidal current waveform, the rotor is started with a higher current than the stating current and with a low frequency which gradually increases, waiting for the rotor at its transit through 80, 100, 260 and 280 mechanical degrees. Once the intended steady-state speed has been reached, a practically sinusoidal current is applied and the rotor is waited for at transit through the zero points. The position of the rotor is checked with a linear magnetic position sensor.

15 Claims, 7 Drawing Sheets

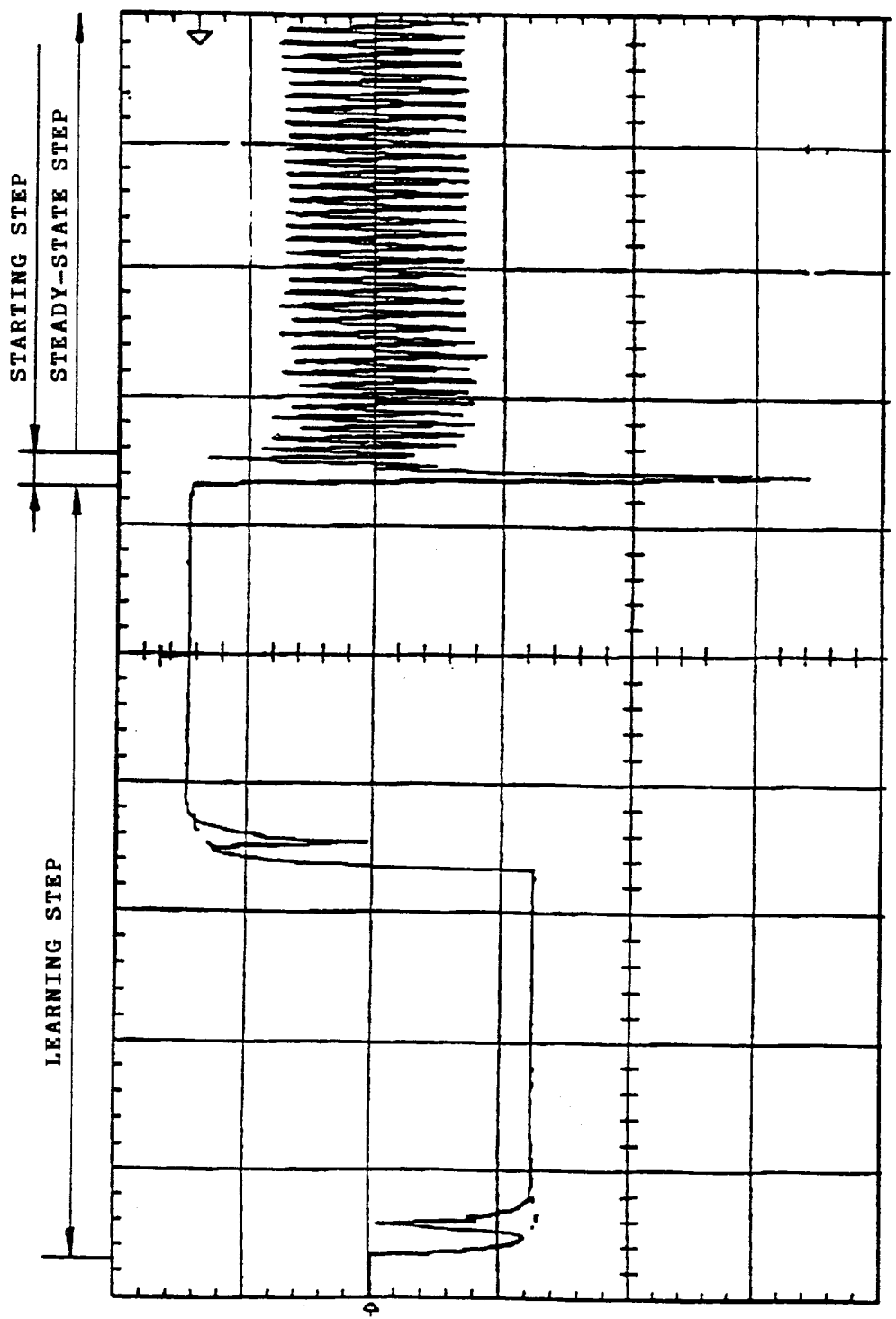

METHOD FOR THE STARTING AND STEADY-STATE SUPPLY OF A PERMANENT-MAGNET SYNCHRONOUS MOTOR PARTICULARLY FOR DRIVING A HYDRAULIC PUMP

CROSS-REFERENCE TO RELATED APPLICATIONS

This application is a continuation of application number PCT/EP99/05554 Filed on Aug. 2, 1999

BACKGROUND OF THE INVENTION

The present invention relates to a method for the starting and steady-state supply of a permanent-magnet synchronous motor, particularly for driving a hydraulic pump of the centrifugal type.

Permanent-magnet synchronous motors are highly advantageous, because they are highly efficient in operation.

However, the problem that arises particularly for high-power motors driving loads which have a considerable inertia is the starting step.

Mechanical means or electronic control procedures have been adopted in order to solve this problem according to the prior art.

The mechanical means consist in particular in uncoupling the impellers of the driven hydraulic pumps, so that the rotor can start freely through an angle of less than 360° and then engage the impeller and continue its rotation.

It is evident that this solution can be used when the rotor has a low mechanical inertia which in any case allows it to reach the steady state in a half-period if, as normally occurs, the rotor has two poles.

In practice, this means that it is not possible to use these mechanical devices in order to have a medium- to high-power pump which involves rotors whose dimensions and consequent inertia are a function of said power.

Electronic starting procedures are also known in which the rotor is controlled in its position and the sinusoidal mains current is "chopped" with static switches so that it is in a phase which does not contrast the movement of the rotor.

This solution, which uses the current without modifying the mains frequency, does not allow to achieve high static torques and therefore still does not allow to supply medium- to high-power motors.

Other methods use an inverter which generates a waveform whose frequency gradually rises, the behavior of this frequency being stored beforehand in the power supply circuit.

This solution, too, suffers considerable problems, since permanent-magnet electric motors are all different from each other, particularly as regards the magnetic characteristics of the rotor, despite being manufactured with identical dimensions.

Motors of this type are also different as regards the stator pack.

At the stator level, the problem is modest, since there can be only differences due to the lamination pack and to the windings of the coil.

However, these differences are not particularly relevant and important in terms of influence on the magnetic circuit.

The greatest differences instead occur in the rotors, because they are not identical and practically never have an equal and uniform direction of the north and south fields.

There is always a north and a south, but with respect to the geometry of the rotor the field shapes are usually the ones designated by 10 and 11 in FIG. 2 with respect to a cylindrical permanent-magnet rotor, designated by the reference numeral 12.

This entails first of all an asymmetry in the movement of the rotor, so that the motor runs unevenly.

A typical motor with permanent-magnet rotor is generally designated by the reference numeral 13 in FIG. 1, where the rotor is now designated by the reference numeral 14 and is contained between two poles made of laminations 15 and 16 which are the ends of a stator pack 17 whereon two coils 18 and 19 are mounted which induce the stator field.

In order to be able to privilege one direction of rotation for the rotor, the poles have recesses 20 and 21 which set the axis of symmetry 22 of the rotor 14 at an angle with respect to the median axis of the poles 15 and 16.

There is also a position sensor 23 which is arranged in the intermediate region between the poles 15 and 16.

This conventional structure suffers a further problem due to the displacement of the neutral axis of the rotor with respect to the position of the sensor 23.

All these problems prevent exact knowledge of the magnetic structure of the motor and of its true characteristics.

Another problem arises from the fact that the intended starting method is linked to the combination of a permanent-magnet synchronous motor and a centrifugal hydraulic pump.

The mechanical-hydraulic characteristics of the pump also determine problems in starting, since they too are neither known nor exactly predictable.

Many factors are in fact involved in the starting of a hydraulic pump.

For example, if the pump has been motionless for a long time, there may be problems in terms of deposits of products conveyed by the water which produce unknown initial loads.

This problem can also occur during rotation, when conveyed objects become located in the impeller chamber, sometimes to the point of jamming and locking the rotation of the pump.

SUMMARY OF THE INVENTION

The aim of the present invention is to provide a method for the starting and steady-state supply of a permanent-magnet synchronous motor, particularly for driving a centrifugal hydraulic pump, which is capable of overcoming all the proposed problems and in particular of adapting to the problems of each individual motor.

A consequent primary object is to provide a method which allows to start permanent-magnet synchronous electric motors, even of the medium-power and medium- to high-power types and in a preset direction.

A consequent primary object is to provide a method for starting and subsequently supplying a permanent-magnet synchronous motor which minimizes the power absorbed during starting and in the steady state.

Another important object is to provide a method for the steady-state power supply of a permanent-magnet synchronous motor wherein cosφ is practically equal to 1.

This aim, these objects and others which will become apparent hereinafter are achieved by a method for the starting and steady-state supply of a permanent-magnet synchronous motor, particularly for driving a centrifugal hydraulic pump, characterized in that it comprises the following steps:

1) a learning step, during which the rotor is turned through two consecutive turns covering 180 mechanical degrees, applying to the stator a DC starting current for the first 180 mechanical degrees and inverting it for the second 180 mechanical degrees after the rotor has reached the first 180 mechanical degrees and storing, by means of a memory that resides in the power supply circuit combined with a linear magnetic position sensor, the operating characteristics in a discrete number of points that correspond to preset angular positions of the rotor, determining during said step, the starting current and the real zero position of the rotor;

2) a starting step, during which a higher current than the starting current determined during the first step is applied at an initially low frequency which then gradually increases, waiting for and checking, by means of the linear sensor, the transit of the rotor at 80 and 100 mechanical degrees and subsequently at 260 and 280 mechanical degrees;

3) a steady-state step, during which once the steady-state frequency and therefore the steady-state speed have been reached, the applied current is practically sinusoidal and the rotor is waited for at transit through the zero points before inverting the direction of the current;

control functions being provided which, if the rotor slows during the steady state step, return the procedure to the starting step and which, in case of locking of the rotor, reversal of the rotation direction, failure of the linear sensor or anomalies, return the procedure to the learning step.

BRIEF DESCRIPTION OF THE DRAWINGS

Further characteristics and advantages of the present invention will become apparent from the following detailed description of a preferred embodiment of the method, illustrated in the accompanying drawings, wherein:

FIG. 9 plots the current from the learning step to the starting step and then to the steady-state step.

DESCRIPTION OF THE PREFERRED EMBODIMENTS

Figure 1:
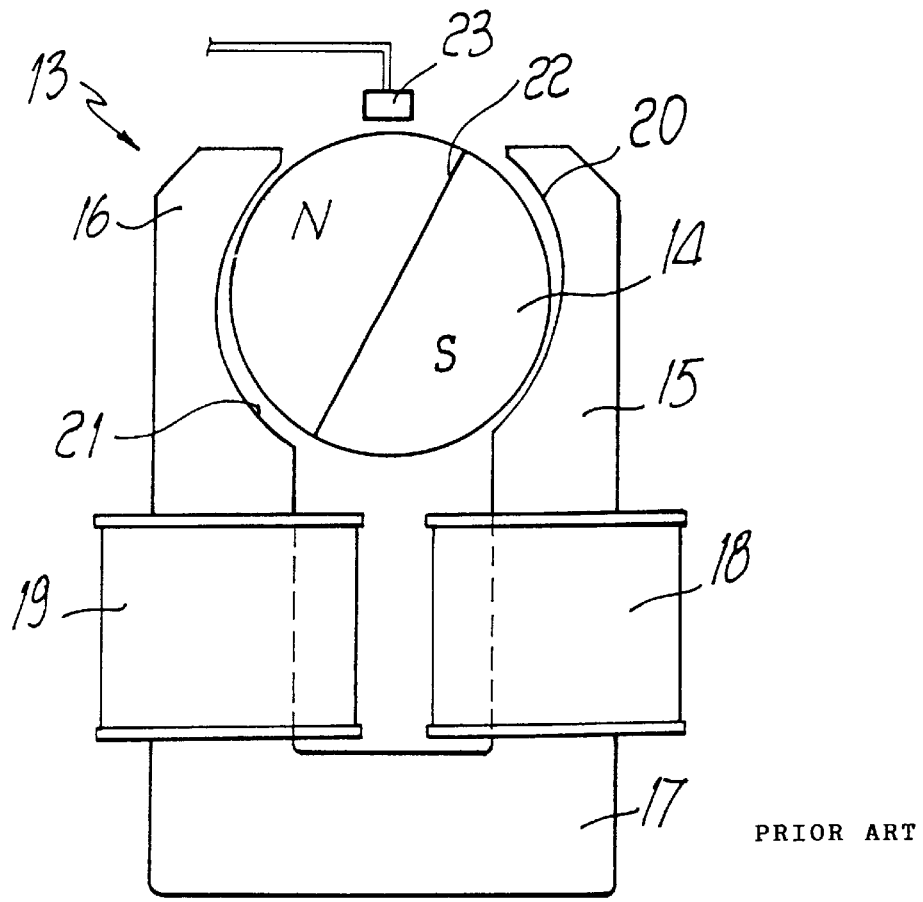
FIG. 1, which has already been described, is a schematic exemplifying diagram of the structure of a permanent-magnet synchronous motor to which the method is applied.
Figure 2:
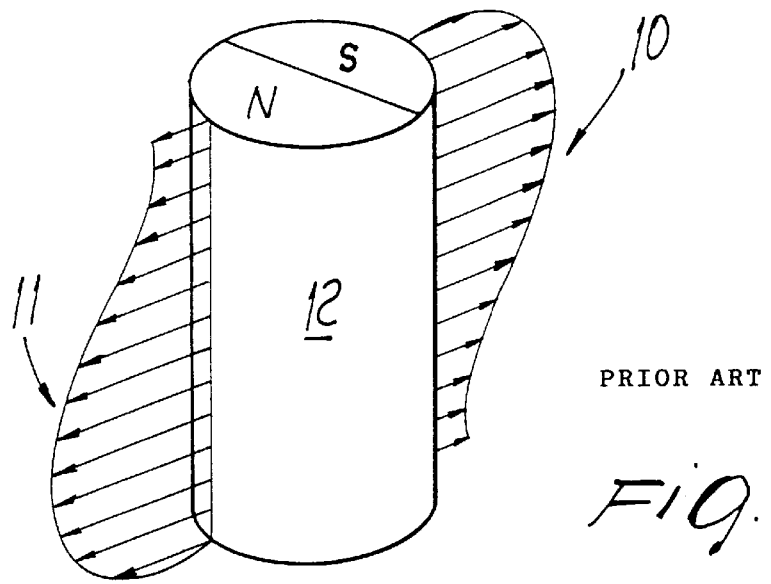
FIG. 2, which has already been described, shows the abnormal arrangement of the magnetic field of a permanent-magnet rotor.
Figure 3:
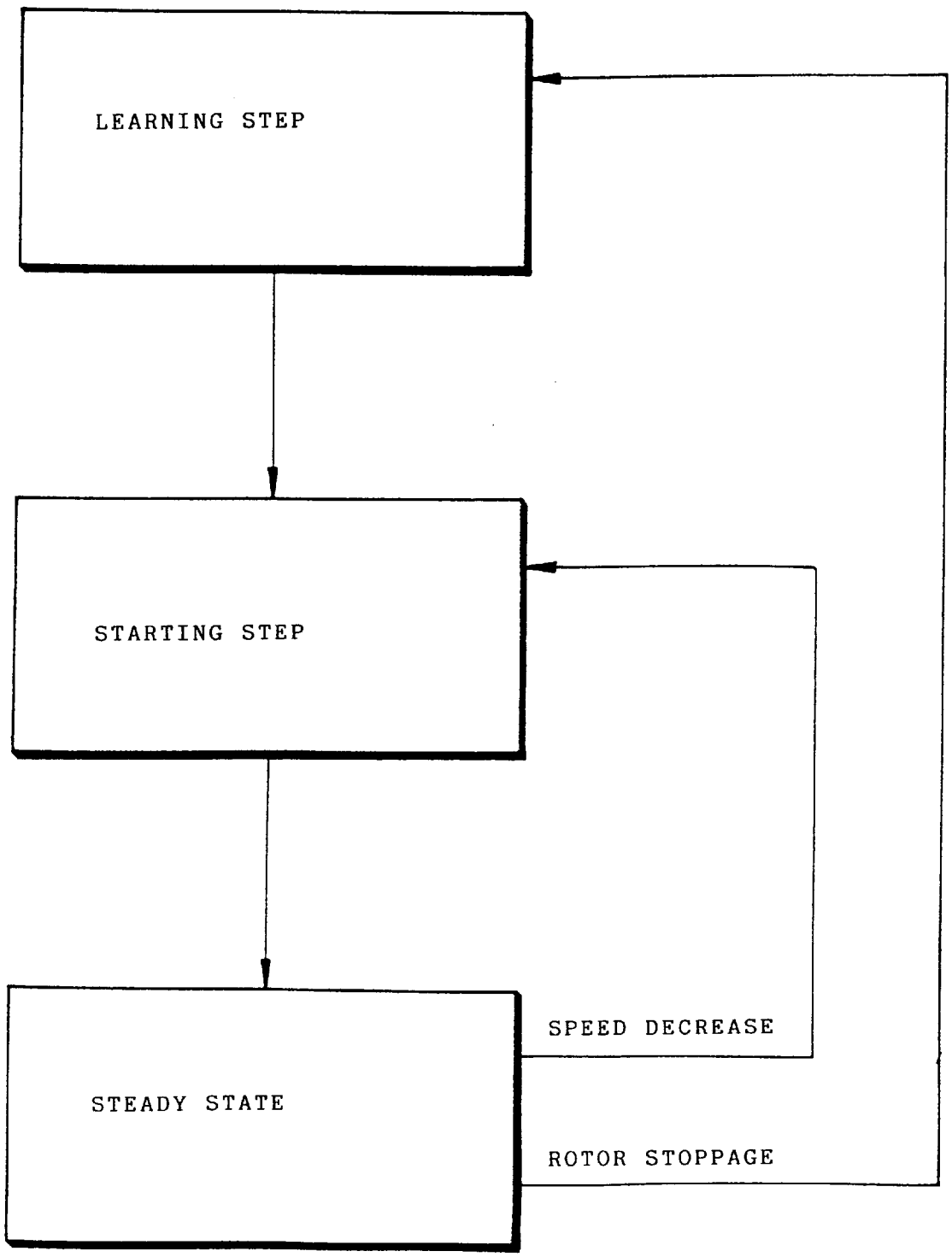
FIG. 3 is a flowchart of the three steps of the method and of their concatenation.

The method according to the invention is composed of three steps, as shown schematically in FIG. 3:

1) a learning step;
2) a starting step;
3) a steady-state step.

The diagram of FIG. 3 illustrates a feedback flowchart, described in greater detail hereinafter, which shows that if the rotor slows during the steady-state step, the procedure returns to the starting step, while if the rotor stops or other anomalies occur during the steady-state step the procedure returns to the learning step.

Figure 4:
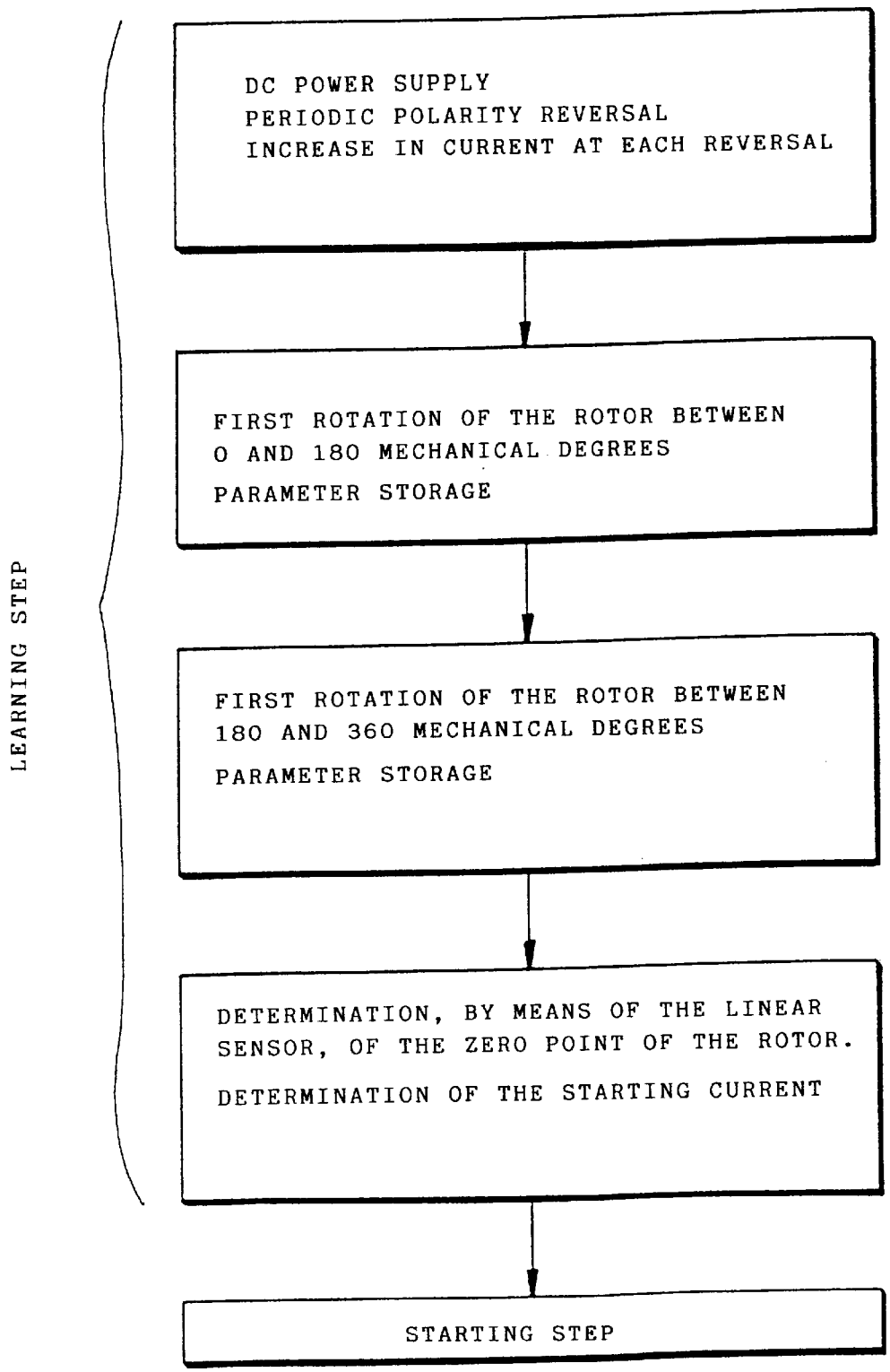
FIG. 4 is a flowchart of the learning step.

During the learning step (FIG. 4), the rotor is turned through 180 mechanical degrees by applying a low-value DC current on the stator field.

Figure 7:
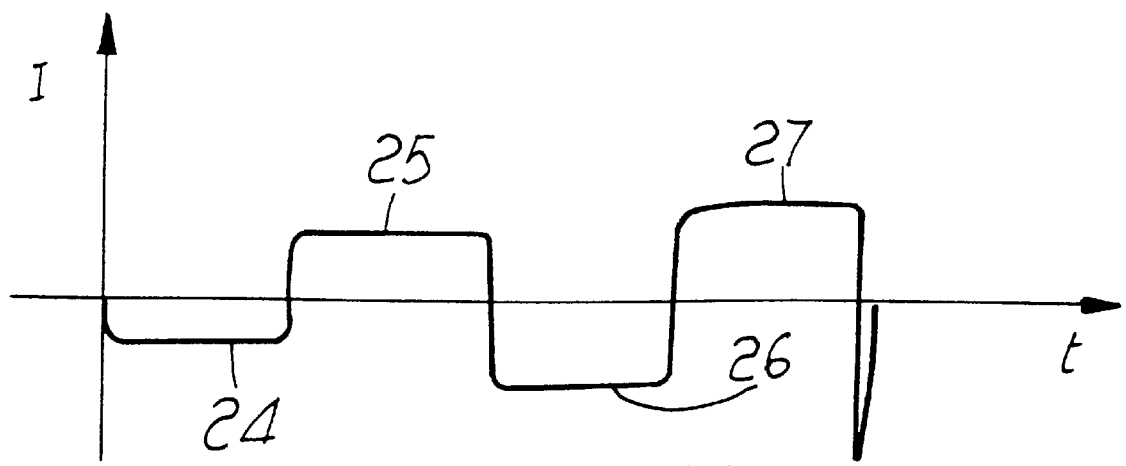
FIG. 7 plots the current during the learning step, until the first movement of the rotor occurs.

This step is shown more clearly in FIG. 7, which shows that a DC current is supplied, alternating it with gradually rising intensities which, for the intervals 24 and 25, produce no movement of the rotor, while the interval 26 represents the current for which the rotor turns so as to reach, after a rotation through 180°, the position that corresponds to the one determined by the magnetic field of the poles 15 and 16, whereas the further rotation through 180° occurs in the subsequent interval because the field has reversed.

The reason for alternating the current in periods which can be on the order of 200 milliseconds is that even if the rotor was in a concordant position with respect to the magnetic field, in the subsequent interval it is forced to rotate through 180°.

In this manner, first of all the procedure determines which minimal current moves the rotor through the first 180° and which current moves it through the second 180°.

These two values are usually not mutually identical, indeed because of the non-uniformity and asymmetry of the rotor and stator.

These two current values are considered as starting values; the highest of these two values is stored in a memory which resides in a processor which belongs to the power supply device, and such highest value is considered for all purposes as the value of the starting current of the motor.

By forcing a current of this value, one is certain that motor connected to that hydraulic pump in those conditions will move in any case.

During rotation steps, the linear magnetic position sensor 23 stores a series of values, again in the processor, which correspond to the angular position of the rotor and relate to the first 180 mechanical degrees of rotation and to the subsequent 180 mechanical degrees of rotation, which as a whole form a complete rotation.

Since the linear sensor 23 is arranged in an intermediate region between the poles of the stator, the value of the magnetic field that it detects is not zero, as it should be in theory, when the rotor is not moving, because, as mentioned, in order to start the rotor in a given direction the poles of the stator 15 and 16 are asymmetrical and are shaped so that the rotor arranges itself with an axial offset angle of approximately 5°, which produces at to start more easily also determines its direction of rotation.

By storing with the linear sensor the two field values that occur at 180 and 360 mechanical degrees it is possible to determine the exact position of the rotor and these data are stored in the processor.

During this learning step, therefore, not only has the starting current been determined, but the real zero point of the rotor has also been determined and the parameters at 90 mechanical degrees and 270 mechanical degrees have also been determined by extrapolating the values acquired during the movement.

This self-learning step occurs in a very short time which can be approximately 400 milliseconds.

This self-learning step is performed every time the motor is restarted, so that any modifications or new situations of the motor and of the pump associated therewith are compensated for.

New situations, such as an abnormal load on the impeller, can determine a different starting current at each startup; this is why the learning step is performed every time.

In addition to this, it should be noted that the motor is supplied every time with the minimum current that is compatible with its movement, reducing consumption and avoiding unnecessary stresses on the stator.

The learned data, as mentioned, yield the values at 90 mechanical degrees; by subtracting approximately 20–25% from this, the procedure obtains the value for which the rotor has covered the first 80 mechanical degrees of its rotation, and this value is repeated at approximately 100 mechanical degrees of rotation.

Figure 8:
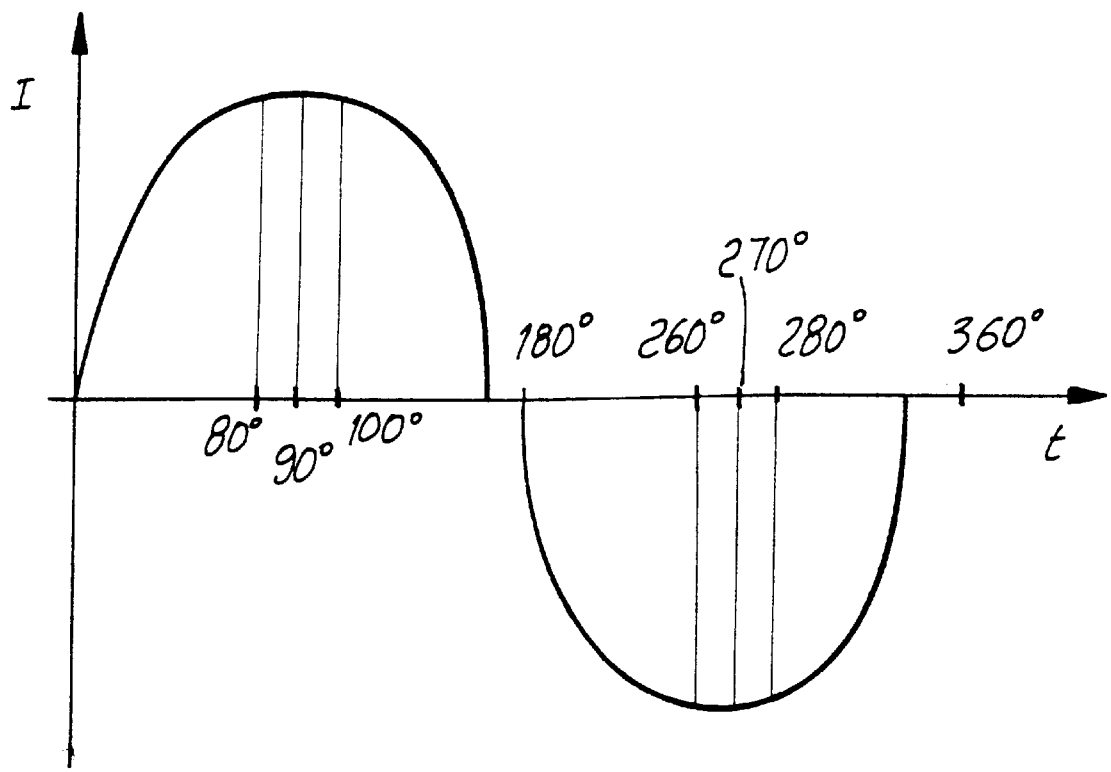
FIG. 8 plots the current in the first two rotations through 180°.

When the rotor has covered the first 100 mechanical degrees, it can no longer move back and therefore it rotates until it reaches 180 mechanical degrees (FIG. 8).

These two data, at 80 and 100 mechanical degrees of rotation, are also acquired by the microprocessor, which subsequently uses them for checking functions.

Figure 5:
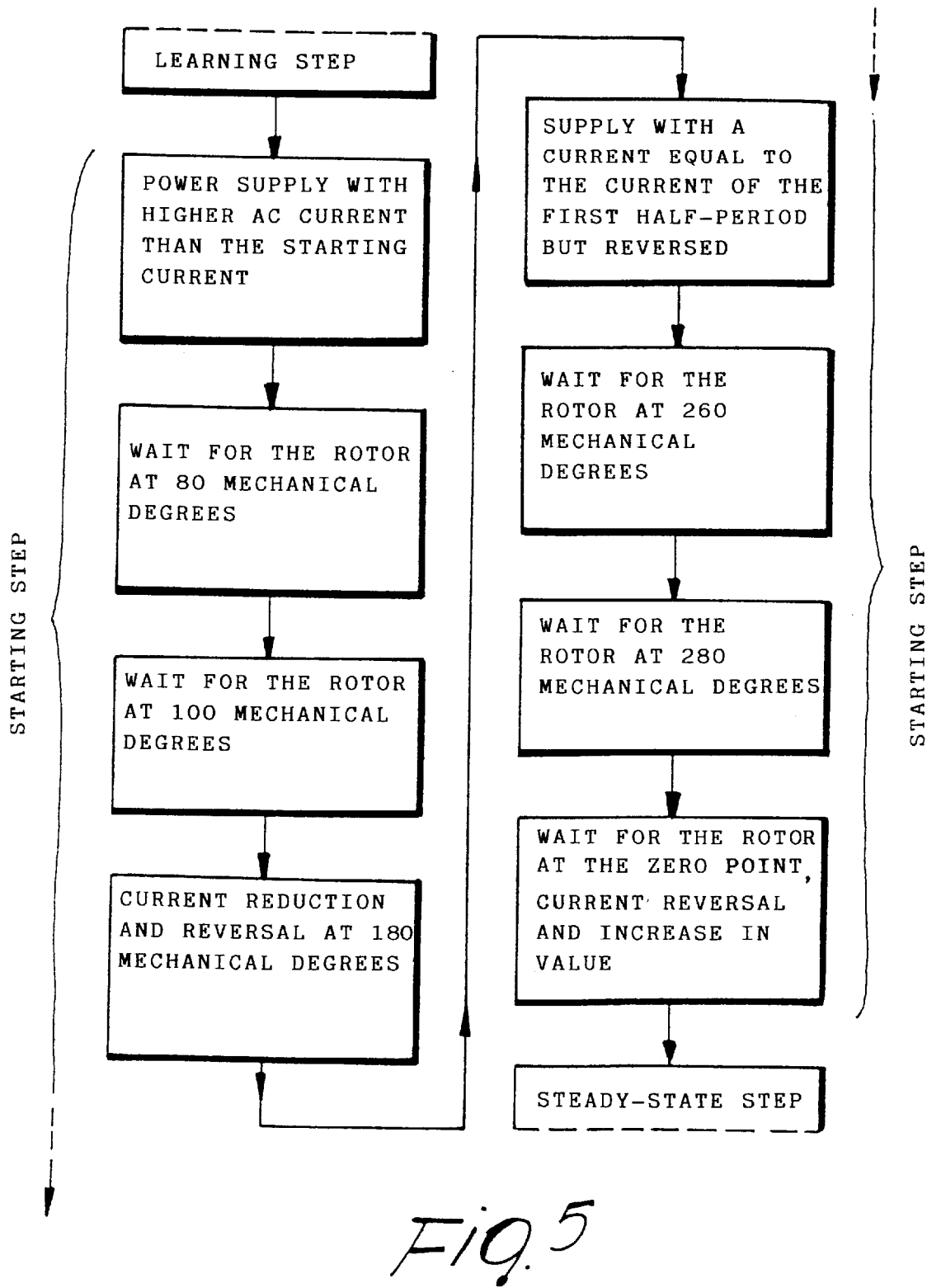
FIG. 5 is a flowchart of the starting step.

Once these data have been stored, the learning step is completed and the procedure moves on to the starting step (FIG. 5).

The starting step begins when the rotor has arrived at the zero point of the second half-rotation, applying a current which is equal to the starting current determined during the learning step increased by approximately 25% and applied sinusoidally, reconstructing it by means of the power supply circuit controlled by the microprocessor.

This current is applied and maintained until the rotor has reached the first 180 mechanical degrees, where the procedure waits for it if it is delayed with respect to the preset theoretical time.

The wait beyond the theoretical time can be conveniently approximately 1.5 seconds.

If the rotor does not reach 80 mechanical degrees within this time, this means that for some reason it is either blocked or self-learning has not occurred correctly and therefore the starting step is interrupted automatically and a learning step is resumed.

If instead the rotor reaches 80 mechanical degrees, the current is maintained until 100 mechanical degrees are reached and then a decreasing sinusoidal pattern is followed.

This operation is performed for a first complete period; in this way one is certain, with the wait times, to be able to start even high-inertia rotors, since the procedure always waits for the rotor at its transit at the preset angular positions.

After the first complete cycle, after having ascertained that the rotor does not jam, the procedure waits for the rotor exclusively at its transit by the zero point and no longer at intermediate angles.

The frequency is then increased, again checking the zero point transit of the rotor; in this manner, by increasing or decreasing the set frequency turn by turn according to the longer or shorter waits for the rotor on the zero point, said rotor is gradually brought to the preset steady-state speed.

In practice, one works as if there were a virtual starter motor which gradually drives the rotor up to the steady-state speed.

It is convenient to wait for the rotor on the zero point also because of the fact that it has been found that non-uniform or asymmetrical rotors, waited for at points other than zero, might lead to complications and false readings and to saturation of the stator pack.

If different values were assigned in the two half-periods, DC components would be generated which would saturate the stator pack, to which only relatively low induction values B can be applied.

In this situation, the power supply, which is an inverter, behaves as a synchronous device, i.e., it is the power supply that adapts to the motion of the rotor rather than the opposite.

Figure 6:
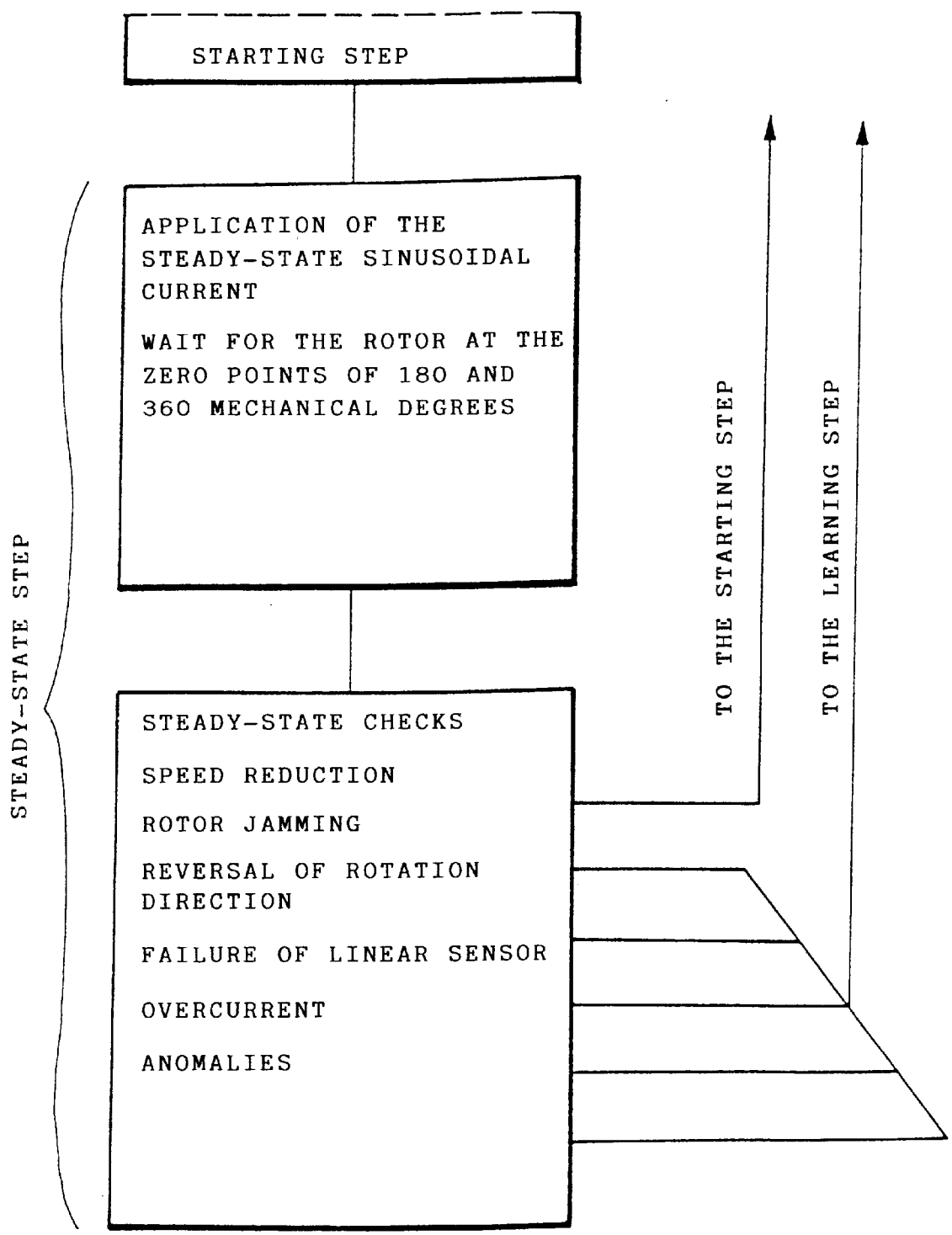
FIG. 6 is a flowchart of the steady-state step.

This situation also occurs in the steady-state step (FIG. 6), in which the power supply process continues in a controlled manner.

This means that if the rotor for example slows down for any reason, the procedure is returned as if to the starting step, i.e., the inverter reduces the power supply frequency, since it cannot apply a negative half-wave if the positive one has not been completed or if it has not waited for the rotor to reach the zero point.

In this reduced-frequency situation, the inverter gradually increases the current, accordingly returning the rotor to the frequency that corresponds to the preset speed, albeit under different current conditions.

In the steady-state step, if for any reason the rotor arrives early at the zero point, this situation reduces the supplied current so as to return the rotor to the conditions that provide correct zero transit; in practice, this means that the supply current is always the appropriate one and is in phase, providing a $\cos\phi$ equal to 1.

As a safety measure in case the rotor jams or the sensor fails or the direction of rotation reverses, the power supply of the motor shuts down immediately.

In this case, the learning procedure is repeated until the motor restarts; if the motor fails to restart because it is jammed, there is a limit for the current which is set in order to determine the starting current.

In this case it is possible to provide for the total or temporary halting of the starting procedure.

Reversal of the sinusoidal curve can be made to occur a short time before the rotor reaches the real zero point.

In this way, for a short period of time the synchronous motor becomes an alternator.

With this procedure, the rotor is assuredly in phase at the end of each period.

This allows to increase the frequency above the nominal 50 Hz of the mains frequency, reaching for example 60 Hz.

In this way, since the head of the pump is a function of the square of the speed and since the flow-rate also varies accordingly, it is possible to achieve higher flow-rates without substantially increasing current consumption.

In this case also, $\cos\phi$ remains equal to 1, with great benefit for the resulting power.

From the above description and the figures it is clear that the aim and all the intended objects have been achieved, and that in particular a method for starting and maintaining the steady state has been provided which allows assured starting even with medium- and high-power motors and with considerable inertias due both to the rotor and to the impeller of the pump.

Furthermore, since $\cos\phi$ is always practically equal to 1, maximum efficiency of the motor is achieved and therefore the current absorbed is always minimal, with great benefit in terms of power consumption.

Of course, while maintaining the same sequence of operating steps and operations within each step, the method can be performed using power supplies with circuits of different kinds and also with components of various kinds which are adapted to perform the required operations.

The disclosures in Italian Patent Application No. MI98A001876 from which this application claims priority are incorporated herein by reference.

What is claimed is:

1. A method for the starting and steady-state supply of a permanent-magnet synchronous motor, particularly for driving a centrifugal hydraulic pump, comprising the following steps:

a) a learning step, during which the rotor of the motor is turned through two consecutive turns covering 180 mechanical degrees, applying to the stator a DC starting current for the first 180 mechanical degrees and inverting it for the second 180 mechanical degrees after the rotor has reached the first 180 mechanical degrees and storing, by means of a memory that resides in the power supply circuit combined with a linear magnetic position sensor, the operating characteristics in a discrete number of points that correspond to preset angular positions of the rotor, determining, during said learning step, the starting current and the real zero position of the rotor;

b) a starting step, during which a higher current than the starting current determined during the first step is applied at an initially low frequency which then gradually increases, waiting for and checking, by means of the linear sensor, the transit of the rotor at 80 and 100 mechanical degrees and subsequently at 260 and 280 mechanical degrees;

c) a steady-state step, during which once the steady-state frequency and therefore the steady-state speed have been reached, the applied current is practically sinusoidal and the rotor is waited for at transit through the zero points before inverting the direction of the current;

control functions being provided which, if the rotor slows during the steady state step, return the procedure to the starting step and which, in case of jamming of the rotor, reversal of the rotation direction, failure of the linear sensor or anomalies, return the procedure to the learning step.

2. The method according to claim 1, wherein during the learning step the stator is supplied with a DC current whose intensity gradually increases, periodically inverting said current until the rotor performs a first rotation through 180 mechanical degrees and a second rotation, after current inversion, through another 180 mechanical degrees.

3. The method according to claim 1, wherein during the learning step the minimum current values that produce the rotation through the first and second 180 mechanical degrees are stored and the one having the highest value is considered as the starting current.

4. The method according to claim 1, wherein during said learning step, the characteristics detected in a discrete number of angular positions of the rotor are stored and interpolated so as to obtain a continuous curve which is similar to a sinusoid which describes the real behavior of the rotor at all points of the first and second half-periods, the positions being detected occurring by means of the linear magnetic position sensor.

5. The method according to claim 1, wherein during said first learning step the real zero points of the rotor after 180 and 360 mechanical degrees are determined by means of the linear sensor.

6. The method according to claim 1, wherein during said learning step the current values at 80 and 100 mechanical degrees of a first half-period and at 260 and 280 mechanical degrees of a second half-period are determined by extrapolation.

7. The method according to claim 1, wherein in the starting step, after the rotor has completed a second half-period of the learning step, an AC current is applied whose sign is reversed with respect to the current of the second half-period and whose value is considerably higher with respect to said starting current.

8. The method according to claim 7, wherein the rotor is waited for at its transit through the first 80 mechanical degrees and then the current is kept stable up to 100 degrees, where the rotor is again waited for, and is then decreased up to 180 mechanical degrees, where the rotor is again waited for before inverting the current with an equal behavior in the second half-period, until 360 mechanical degrees, the initial zero point, are reached.

9. The method according to claim 8, wherein the maximum wait time is on the order of 1.5 seconds.

10. The method according to claim 9, wherein at the first angular reference not reached by the rotor within the preset wait time the method steps are interrupted and restarted with the learning step.

11. The method according to claim 1, wherein at the end of a second half-period of the starting step, a sinusoidal current is applied which gradually increases in value and frequency until the steady-state speed is reached, checking the rotor only when it passes through the zero points and optionally waiting for said rotor for a preset time before reversing the phase.

12. The method according to claim 11, wherein in case of delay of the rotor due to an increase in the applied load, the method returns as if to the starting step, reducing the frequency and increasing the current until the steady-state speed is reached again, possibly with a higher value of the current.

13. The method according to claim 11, wherein if the rotor arrives early due to a decrease in the applied load, the procedure returns as if to the starting step, reducing the current until the rotor is back in phase again, said rotor being checked at its transition by the zero points.

14. The method according to claim 1, wherein in the steady-state step jamming of the rotor, reversal of the direction of rotation, failure of the linear magnetic position sensor and other anomalies stop the power supply and return the method to the learning step.

15. The method according to claim 1, wherein the current is generated with instantaneous frequencies and values by an inverter which is controlled by a processor in which the learning and control memories reside.

* * * * *